ELECTRONIC SYNCHRONIZING DEVICE AND MAGNETIC SWITCH

Filed Jan. 4, 1947 3 Sheets-Sheet 1

INVENTOR.
SAMUEL C. HURLEY, JR.
BY Benedict & Swartwood
ATTORNEYS

ELECTRONIC SYNCHRONIZING DEVICE AND MAGNETIC SWITCH

Filed Jan. 4, 1947 3 Sheets-Sheet 2

INVENTOR.
SAMUEL C. HURLEY, JR.
BY Benedict & Swartwood
ATTORNEYS

ELECTRONIC SYNCHRONIZING DEVICE AND MAGNETIC SWITCH

Filed Jan. 4, 1947 3 Sheets-Sheet 3

INVENTOR.
SAMUEL C. HURLEY, JR.
BY Benedict & Swartwood
ATTORNEYS

Patented Aug. 8, 1950 2,518,325

UNITED STATES PATENT OFFICE 2,518,325

ELECTRONIC SYNCHRONIZING DEVICE AND MAGNETIC SWITCH

Samuel C. Hurley, Jr., Danville, Ill.; Wilmina L. Hurley, executrix of said Samuel C. Hurley, Jr., deceased, assignor to Wilmina L. Hurley, Danville, Ill.

Application January 4, 1947, Serial No. 720,226

2 Claims. (Cl. 250—27)

This invention relates to an electronic synchronizing device and circuit and particularly to a magnetic switch as the control means for a control grid in an electronic amplifying tube.

This invention is concerned with the problem of synchronizing one operation with another. It is concerned with synchronizing a plurality of successive operations as well as synchronizing successive operations one with another. It is concerned with the circuit used in such operations where in a predetermined bias must be maintained on a control grid in an amplifying circuit for a predetermined period corresponding to a required operation.

For example in color printing operations, particularly with rotogravure printing presses, where the final print comprises a plurality of superimposed colors, it is necessary that any color superimposed upon another comes at the proper place. If the colors are placed properly, the two operations are in registration. If the colors are improperly placed, the two operations are out of register. My device is primarily concerned with colored printing but it is applicable to other operations such as a cutting or trimming operation which must occur in register with or in a predetermined location relative to some previous operation. For example, labels which are to be pasted on canned goods are printed in long rolls and a cutting tool must cut between the individual labels at the proper place. My device is suitable for causing the cutter to cut "in register" (i. e.: in the proper position relative thereto) with the previously printed material.

My device is also useful in connection with stamping, forming and similar operations where it is necessary to have a plurality of successive operations each occur in a certain fixed or predetermined relation with the others.

My device is particularly useful in color printing where the first printing roll, besides accomplishing the regular printing, places an index on a moving web of paper and one or more successive printing cylinders must print in register with the first. A photoelectric scanning device inspects the index mark and the photoelectric scanner, in conjunction with a timing device of the type provided herein synchronized with the successive printing cylinder or cylinders controls the registration of said successive printing operations with the first.

My device is also useful in controlling display and store signs wherein the signs are to display one color for a certain period and then another color for another predetermined period. The circuit of my invention is also useful in many types of machine work. For example in grinding operations, my device can control the starting of the grinding operation and the finish of a grinding operation in order that only a predetermined amount of grinding would occur on the article being ground.

The same thing applies to lathes where a cutting tool is to remove only a predetermined amount from an object such as an axle and similar objects. It may also be used for controlling the longitudinal or cross-feed of a cutting tool in a lathe, i. e., the cutting tool may be brought into working position at a certain point on the work and when it reaches another predetermined point, the cutting tool may be retracted from working position and returned to its initial starting point.

There are many other applications of the circuit of my invention described herein which will be apparent to those familiar with the art and which are within the scope of the invention.

It is therefore an object of my invention to provide an improved type of circuit to accomplish the above set forth and similar purposes.

It is an object of my invention to provide an improved circuit in connection with my magnetic switch whereby a predetermined bias is maintained on a control grid for a predetermined period corresponding to a certain mechanical operation.

It is a further object of my invention to provide an improved circuit for use in connection with registration control equipment.

It is a further object of this invention to provide a magnetic switch which is synchronized with an element operating on a moving web and to cause the switch to cooperate with a photoelectric scanner for maintaining the operation in register.

Another object of the invention is to provide an improved electronic timing means in connection with the switch for maintaining a certain potential on the control grid in the amplifying tube in synchrony with the speed of the moving element.

It is also an object of my invention to provide an electronic circuit having two control grids in which one control grid is connected to a photoelectric scanner and the other control grid is connected to my magnetic switch which is synchronized with an element operating on a moving strip of material.

It is still a further object of my invention to provide an electronic amplifying circuit for use in connection with my improved timer which determines any forward and rearward deviation in the position of an element operating on a continuous moving web in relation to a preconditioned portion of said web together with means responsive to said circuit for varying the relative positions of said element and said web when said deviation is not within the desired limits of tolerance. In other words, I have provided an improved circuit which not only determines whether the device is in register, but if it is out of register, and in which direction it is out of register and I further provide means for correcting, in the proper direction and by the proper amount, any misregister indicated.

Broadly my invention comprises a magnetic switch having a moving magnet with north and south poles, the movement of said magnet being synchronized with the movement of a mechanical operation, a plurality of shunts spaced from but along the path of the movement of one of said poles of the magnet, an induction coil associated with each of said shunts whereby a predetermined current is generated in each induction coil as said one pole of said magnet passes the corresponding shunt, and operative means responsive to the current so generated in each shunt for controlling said mechanical operation.

More specifically my invention comprises a synchronizing device for maintaining a predetermined relationship between mechanical operations comprising an amplifying tube having an anode circuit, a cathode circuit and a control grid, an energy translation means in said anode circuit, a moving magnet having north and south poles, the movement of said magnet being synchronized with the movement of one of said mechanical operations, a shunt spaced from but along the path of movement of one of said poles of said magnet, an induction coil associated with said shunt whereby a predetermined current is generated in said induction coil when said pole of said magnet passes said shunt, said control grid being connected to said induction coil so that a predetermined voltage change is placed on said grid when said one pole of said magnet passes said shunt, said energy translation means being responsive to said change in voltage on said control grid, and operative means associated with one of said mechanical operations and responsive to said energy translation means for maintaining said predetermined relationship between said mechanical operations.

Still more specifically my invention relates to a registration control device comprising an element operating on a material; a light sensitive circuit containing a light sensitive device, said light sensitive device associated with said element and said material for detecting the occurrence of a preconditioned portion of said material; an electromagnetic switch having an indexing position correlated with said preconditioned portion of said material; said electromagnetic switch synchronized with the movement of said element for determining the position of said element relative to said indexing position; said electromagnetic switch comprising a moving magnet having north and south poles, said movement of said magnet correlated with the movement of said element as above set forth, a plurality of shunts spaced from but along the path of movement of one of said poles of said magnet, an induction coil associated with each shunt whereby a predetermined voltage is generated in said induction coils as said one pole of said magnet passes each shunt, an electronic circuit simultaneously responsive to both said light sensitive device and said magnetic switch for determining the position of said preconditioned portion of said material relative to its indexing position, said electronic circuit comprising a first amplifying means, having a first control grid and a second control grid, said first control grid connected to first light sensitive circuit such that voltage changes thereon are responsive to and controlled by said light sensitive device, said second control grid of said amplifying means connected and associated with said induction coils such that voltage changes on the second control grid are responsive to and controlled by said predetermined voltage changes induced in said coils.

Other objects, advantages and uses of my invention will become apparent by referring to the drawings in which Figure 1 shows the complete circuit together with a magnetic switch for use in registration control device.

Figure 2 is a diagrammatic plan view of a pair of printing cylinders in which the first printing cylinder places an index mark on the moving strip and the second printing cylinder must be in register with the first. Figure 2 also shows one way of employing a reversible motor for controlling the relative position of the second printing cylinder in relation with a preconditioned portion of the strip.

Throughout the specification and claims, whenever I speak of a positive or negative potential, or a positive or negative bias, I mean the relative potential or bias of the control grid with respect to its cathode. The cathode and grid may both be at a positive potential but if the grid is more positive than the cathode, a positive bias or potential is placed on the grid. Likewise both may have a positive potential but if the grid is less positive than the cathode, a relatively negative potential is placed on the grid.

I will describe Figuers 1, 2 and 3 in connection with a registration control device for maintaining one printing cylinder in register with another although it is distinctly understood that my device is applicable in many fields and applicable to other types of registration control.

Figure 2:
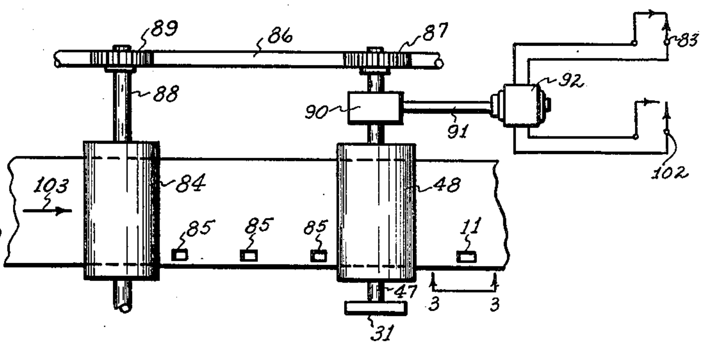

Referring to Figure 2, a plurality of index marks 85 are placed along the marginal edge of the printing web 28 by the printing cylinder 84 and (see Fig. 3) the phototube 10 is positioned to scan the index marks due to the light projected by means of the incandescent light 80 and the projection lens 104.

Figure 1:
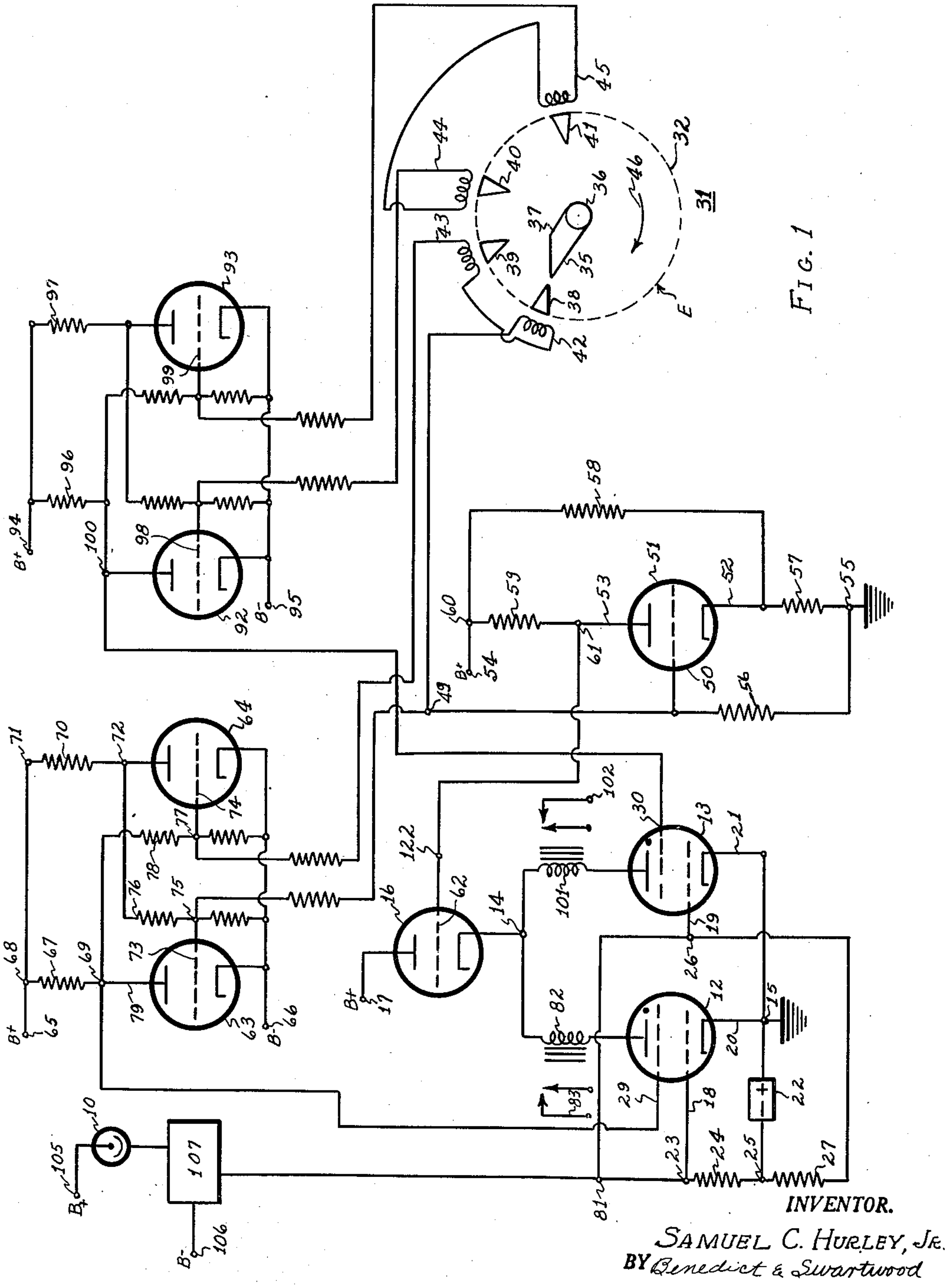
Figure 3:
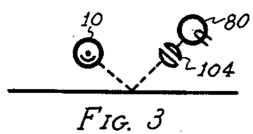
Figure 3 is a schematic side view of a portion of Figure 2 along the lines 3—3 showing the manner of employing a light source and a photoelectric tube for scanning the index marks.

Referring to Figure 1, the phototube 10 just described in connection with Figure 3 is provided in a circuit connected across a direct current source of potential having its positive terminal at 105 and its negative terminal at 106. A suitable amplification system 107 is provided to amplify the signal or pulse from the phototube 10 as the marks 85 (Fig. 2) interrupt the light transmitted to the phototube from the light source 80 via the web 28 (Fig. 3). The amplification system 107 is also adapted and arranged that when the phototube 10 "sees" an index mark, a positive potential is placed at the point 81 which simultaneously places a positive potential or bias on the control grids 18 and 19. When the phototube 10 is scanning the lighter background of the paper, a negative potential is maintained by the amplifying system 107 at the point 81 and a negative bias is maintained on the control grids 18 and 19. The amplification system 107 is not claimed as a novel part of this invention and, since its form and function are well understood by those familiar with the art, it is not illustrated in detail in the drawings.

The function of the phototube 10 in connection with the magnetic timer 32 will be hereinafter more fully described.

Referring again to Figure 1, amplifying tubes 12 and 13 of the gas-filled arc discharge type are connected in parallel between the point 14 and the ground point 15. The two tubes 12 and 13 are connected in series with the vacuum tube 16 and the three tubes 12, 13 and 16 are connected to a source of direct current having its positive terminal at 17. The function of the tube 16 will be more fully described later herein.

The normal bias on the control grids 18 and 19 of the respective tubes 12 and 13 is maintained negative in relation to their respective cathode circuits 20 and 21 by means of the bias rectifier 22. The control grid 18 is connected from the point 23 through the resistor 24 to the negative side 25 of the bias rectifier 22. The control grid 19 is connected from the point 26 through the resistor 27 to the negative side 25 of the bias rectifier 22. Thus when the phototube 10 receives merely a reflected light from the relative light colored strip or web 28 (see Fig. 2) a negative bias is maintained on the control grids 18 and 19 and the gaseous-filled tubes 12 and 13 are unable to ionize even though a positive potential should be placed on either of the screen grids 29 and 30, of the tubes 12 and 13 respectively. The screen grid 29 of the tube 12 and the screen grid 30 of the tube 13 are controlled by an electro-responsive device such as the electro-timer 31 as will be hereinafter described.

Figure 4:
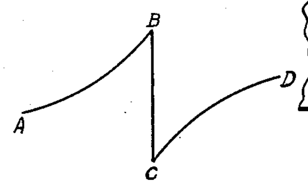
Figure 4 is a graph of the potential created by the electromagnetic timer at each point as the rotating magnet approaches each of a plurality of shunts.

The magnetic timer 32 is shown schematically in Fig. 1 to illustrate the manner in which it functions. The magnetic timer 32 comprises the rotatable magnet arm 35 which is magnetized such that its axis 36 is the north pole of the magnet and the arm 37 is the south pole. The magnet 35 is a permanent magnet but it is within the scope of this invention to use an electromagnet. Four shunts 38, 39, 40 and 41 are arranged around the circumference of rotation of the magnet 35 such that none of the shunts actually touch the magnetic arm 37. The shape of the magnet arm 37 and each of the shunts 38 through 41 control the shape of the potential current which is generated in each of the induction coils associated with each of the shunts. Induction coils 42, 43, 44 and 45 are respectively associated with the shunts 38, 39, 40 and 41. Due to the shape of the magnet arm 37 and the shunts, the shape of the potential curve generated in each of the induction coils as the magnet 35 approaches and leaves each shunt as shown in Figure 4. For example, as the magnet 35 is rotated and approaches the shunt 38, a positive charge is generated in the coil 42 which starts off at the ground potential marked A in Figure 4 and increases to the point B and then sharply drops to a negative potential at point C when the magnet 35 is directly opposite the shunt 38 as shown in Figure 1. As the magnet 35 continues its rotation in the direction of the arrow 46, and leaves the shunt 38, the potential increases from the negative potential at C back to ground potential at D. As the magnet 35 rotates past each shunt the shape of the potential curve is that shown for Figure 4. In my invention I make use of the potential created by the magnet 35 as it passes each shunt. The magnet 35 is attached to and synchronized with the shaft 47 (Fig. 2) which rotates with the printing cylinder 48 so that when the arm 37 of the magnet 35 is mid-way between shunts 39 and 40, the printing cylinder 48 is in the registration position for printing on the sheet 28. In other words, the shunts 39 and 40 determine the in-register position of said device within predetermined limits of tolerance determined by the spacing of shunts 39 and 40. The arm 37 indicates the position of an element such as the printing cylinder 48 relative to a predetermined position which is indicated between shunts 39 and 40.

I will now describe how the magnetic timer 32 functions in controlling the bias of various grids of the amplifying tubes of my circuit. Referring to Figure 1, let it be assumed that the arm 37 is at position E and is being rotated toward the shunt 38. It can be seen from Figure 4 that a positive potential is being generated in the induction coil 42 and therefore a positive potential is placed at the point 49. This places a positive potential on the control grid 50 of the amplifying tube 51. The amplifying tube 51 has a cathode circuit 52 and a loaded anode circuit 53. The tube 51 is connected across a source of direct current potential having its positive terminal at 54 and grounded at 55. Biasing resistors 56, 57 and 58 are provided so that the normal bias is negative which prevents the tube 51 from conducting a current. Tube 51 does not conduct a current until a positive potential is placed on the control grid 50 by the rotation of the magnet 35 as previously described. A load resistor 59 is connected in the anode circuit 53 of the tube 51 between the points 60 and 61. The control grid 62 of the tube 16 is connected to the loaded anode circuit 53 at the point 61. The vacuum tube 16 is thereby connected 180° out of phase with the tube 51. When the bias on the control grid 50 is negative, the tube 51 conducts little or no current and therefore the potential on the control grid 62 is substantially that of the positive terminal 54 and the tube 16 conducts a current or is in condition to conduct a current providing either of the gas-filled tubes 12 and 13 are conducting a current.

It is characteristic of gas-filled tubes which are connected to a direct current source of potential that once such tubes are ionized, they will continue to ionize or conduct a current until the circuit is broken. That is, once they are ionized, the control grids have lost control for preventing the flow of current no matter how negative the control grids are driven. This applies to tubes 12 and 13 of Figure 1 but not to the vacuum tubes 16 and 51 nor to tubes 63, 64, 92 and 93. Therefore the magnet 35, the tube 51 and the tube 16 provide a means for deionizing the tubes 12 and 13 between each inspection of an index mark 11 in order to place the circuit in condition for the inspection of the succeeding mark. As the magnet 35 approaches the shunt 38, it places a positive potential on the control grid 50 which increases the flow of current through the vacuum tube 51 and places a negative potential on the control grid 62 which stops the flow of current through vacuum tube 16 and therefore deionizes or prevents the tubes 12 and 13 from ionizing. As the magnet 35 rotates in a clock-wise direction as indicated by the arrow 46 and comes directly opposite shunt 38 as shown in Figure 1, the potential at 49 sharply drops from a positive potential of B in Figure 4 to the negative potential at point C. When the point 49 receives such a negative potential, it places a similar negative potential on the control grid 50 which substantially stops the flow of current through tube 51 and places a positive potential on the control grid 62 of the tube 16, and the gas-filled tubes 12 and 13 are in a position to conduct a current provided a sufficient positive bias has been placed on the control grids and screen grids of either of the tubes 12 and 13. In other words, when the magnet 35 is opposite shunt 38, the gas-filled tubes 12 and 13 are in effect directly connected to the positive terminal 17 and are ready to ionize if other conditions permit as will be hereinafter set forth. The magnetic timer also controls the bias on each of the screen grids 29 and 30 of the tubes 12 and 13 respectively. However for my device to function I must provide means for maintaining a certain predetermined potential on the screen grids 29 and 30 during a certain portion of the rotation of the magnet 35. This is accomplished by the following circuit.

The screen grid 29 is controlled by the magnet 35 through a pair of amplifying tubes 63 and 64 which are connected in parallel across a source of direct current potential having its positive terminal at 65 and its negative terminal at 66. A load resistor 67 is connected in the anode circuit of the tube 63 between the points 68 and 69. A similar load resistor 70 is connected in the anode circuit of tube 64 between the point 71 and the point 72. The tube 63 has a control grid 73 and the tube 64 has a control grid 74. It should be noted that each of the control grids 73 and 74 is connected to the loaded anode circuit of the other tube. That is, the control grid 73 is connected from point 75 through the resistor 76 to the point 72 and the control grid 74 is connected from the point 77 through the resistor 78 to the point 69. By such an arrangement an increase in current through one of the tubes 63 or 64 automatically causes a decrease in the flow of current through the other tube. While the two tubes 63 and 64 are shown in separate envelopes, it is understood that circuit including anode 79, grid 73 and its respective cathode, and the grid 74 with its respective anode and cathode can all be included in one envelope and will function the same as if in separate tubes as actually illustrated.

Assuming again that the magnet 35 is at the point E and is approaching the shunt 38, a positive potential is placed at the point 49 which places a positive potential on the control grid 73, and the tube 63 is conducting a current. When the tube 63 conducts a current, the point 69 is driven in a negative direction which places a negative potential on the control grid 74 and prevents the tube 64 from conducting any substantial amount of current. When the tube 64 is not conducting, the point 72 is substantially that of the positive terminal 65 and a positive potential is placed on the control grid 73. However when the magnet 35 reaches the position shown in Figure 1, the potential sharply drops from a high positive value B to a low negative value C as illustrated in Figure 4 and this places a negative charge of potential at point 49 which drives the bias on the control grid 73 in a negative direction substantially stopping the flow of current through tube 63. When the flow of current is stopped through the tube 63, a positive potential is placed on the control grid 74 of the tube 64 which is substantially equal to that of the positive terminal point 65 and the tube 64 conducts a current which drives point 72 in a negative direction and maintains a negative potential on the control grid 73. Thus as long as the tube 64 conducts a current, it is impossible for the tube 63 to conduct a current. This is the condition that exists during the entire time that the magnet 35 passes from directly opposite shunt 38 to directly opposite shunt 39. During the rotation of the magnet between the shunts 38 and 39 the tube 63 does not conduct a current and a positive potential is maintained at point 69 which maintains a positive potential on the screen grid 29. It has been heretofore described that also during this time a positive potential exists on the control grid 62 of tube 16. Therefore if simultaneously a positive potential is placed on the control grid 18 of the tube 12, current will flow from the positive terminal 17 through the tube 16 and through the tube 12 to the ground 15.

It has also been described heretofore that when the phototube 10 fails to receive the light from the incandescent light source 80 of Figure 3 by virtue of the index mark 11 interrupting reflection from web 28, that a positive potential is placed on the point 81 which places a positive potential on the control grid 18. Therefore if at any time during the rotation of the magnet between the shunts 38 and 39 the phototube 10 should "see" the index mark 11, the tube 12 will conduct a current which will energize the relay coil 82 and close the relay switch 83.

I have described before that the magnet 35 is synchronized with the printing cylinder 48 such that when the magnet 35 is between the shunts 39 and 40, the printing cylinder 48 (Fig. 2) is within the previously established limits of tolerance for printing on the sheet 28. Therefore if the magnet 35 is between shunts 39 and 40 at the same time phototube 10 "sees" the index mark 11, the printing cylinder 48 is in register with the printing made by cylinder 84 on web 28 (see Fig. 2) within the established limits. The printing cylinder 84 imprints the first printing on the web 28 thereby preconditioning the web for a subsequent operation and at the same time places on the web a series of index marks 85. When one of the index marks 85 reaches the point of inspection by tube 10, I have indicated it by the reference numeral 11. Further referring to Figure 2 I have illustrated schematically a type of printing operation comprising a pair of printing cylinders 84 and 48 in which the first printing roll 84 preconditions the web 28 with a certain impression and the second printing cylinder 48 must place a second impression upon the web 28 in register with the impression placed thereon by the printing cylinder 84. There are many means for driving such a printing press. There are many ways for placing on the index marks 85. I have illustrated longitudinal registration although my device as shown in Figure 1 would apply equally well to lateral registration. Index marks, like the marks 85, are not the only way of obtaining registration. Cuts, notches or holes could be used as the indexing means and the tube 10 could be placed on the side of the web 28 opposite light source 80. Also in lateral registration the phototube 10 can inspect lines or edges of a sheet for the purpose of obtaining registration. In other words the schematic illustration of Figure 2 is only illustrative of one type of registration of an operation in which the registration thereof can be controlled by my invention which is illustrated in Figure 1.

In Figure 2 a common drive shaft 86 is provided by which the shaft 47 with the printing cylider 48 is driven through the gearing means 87. The shaft 88 of the printing cylinder 84 is geared to the shaft 86 by means of the gearing mechanism 89. A speed control device 90 is attached to the shaft 47 between the printing cylinder 48 and the gearing mechanism 87. This is shown schematically since such speed controls are well known for accomplishing the purpose as set forth herein. The speed control 90 is connected by the shaft 91 to the reversible motor 92. When the reversible motor 92 is turned in one direction it urges the device 90 so that as to momentarily increase the speed of the printing cylinder 48 and when the reversible motor 92 is changed in the opposite direction, the speed of the printing cylinder 48 is momentarily reduced by the device 90, it being understood that the increase or decrease in speed persists only so long as motor 92 is in operation. This has the effect of slowly retarding or advancing the position of the printing cylinder 48 with respect to web 28 and the index marks 85.

I have previously described the manner in which the tube 12 conducts a current when the phototube 10 "sees" a mark at 11 when the magnet 35 is at any point between a shunt 38 and 39. When this condition occurs, the printing cylinder 48 is out of register with the cylinder 84. If it is out of register in a direction such that the mark 11 indicates that the web 28 is ready to receive a certain imprint from the cylinder 48, but the cylinder is not yet in position to print such an impression, it is said to lag or be out of register in the retarded direction which means that the cylinder 48 must be advanced in order to bring the device back into register. Therefore when the tube 12 conducts a current it actuates the relay switch 83 to the closed position shown in Figure 2 which causes the reversible motor 92 to rotate in one direction thereby causing device 90 to momentarily increase the speed of and thus advance the printing roll 48 to bring it back into register. Therefore as long as the mark 11 appears so to speak between the shunts 38 and 39 the speed of the cylinder 48 will be increased until the device is back into register, which is the condition when the mark 11 appears between the shunts 39 and 40. It should be noted that if the mark 11 appears between the shunts 38 and 39 and nearer to the shunt 38, a greater adjustment would occur than if the mark appears between the shunts 38 and 39 closer to the shunt 39. I therefore have provided a means such that the more the device is out of register, the greater the adjustment. It is also apparent that the position of the shunts 39 and 40 determine the tolerance. If the two shunts are close together, a close tolerance on registration is obtained. If the shunts 39 and 40 are far apart, a relatively wide tolerance is obtained. The position of the shunts 38 to 41 determine the limits at which the adjustment will be made to bring the device into register.

While in Figure 1 I have illustrated only four shunts for one complete cycle of operation, a plurality of similar four shunts may be provided around the circumference of the rotation of the magnet 35 according to the number of times that the index mark 11 appears at the point indicated in Figure 2 for each rotation of the printing cylinder 48. Another way to accomplish this same object is to have only the four shunts shown in Figure 1 but have a speed reducer associated with the shaft 47 and the magnetic timer 32 so that the magnet 35 rotates several times faster than the shaft 47, the ratio of the gearing depends upon the number of times that the index mark 11 appears for each revolution of the printing cylinder 48. It is obvious that if close registration control is desired and the printing cylinder is of large circumference, that the mark 11 appear a relatively large number of times for each revolution of the printing cylinder 48 in order to maintain the device in register at all times by a number of small corrections thereby obviating a large correction at any one time. That is to say, a number of small corrections for the registration is preferable to a few large corrections. It should be understood that while I have described a rotating timer 32, that a sliding magnet 116 could be used and this would be particularly useful in lateral registration control and/or in many other types of registration control. In all cases a timer such as 32 is provided which synchronizes the operating point of an element operating on a material with a point on the material at which it is desired to have it operate.

When the arm 35 of the magnetic switch 32 passes by the shunt 39, a negative potential is placed on the control grid 74, a positive potential is placed on the control grid 73 and a negative potential is placed on the screen grid 29 of the tube 12. Therefore if the mark 11 so to speak appears between the shunts 39 and 40 at the same time the arm 37 appears between said shunts, the device is in register and a negative potential is placed on the screen grid 29 which prevents the tube 12 from conducting a current, the relay switch 83 is not actuated and no change in the speed of the printing cylinder 48 results. Thus when the device is in register, the tube 12 does not conduct a current. Therefore the tube 12 conducts a current and its relay switch 83 is actuated only when the device is out of register in a rearward direction.

Thus shunts 38 and 39 provide a lag registration control means for indication that the device is out of register in a rearward or retarded direction and said shunts also indicate the relative position of said printing roll 48 with a predetermined position, said predetermined position being the point indicated when the arm 37 is between shunts 39 and 40. Shunts 38 and 39 also provide a means for indicating the approach of the operation of the printing cylinder towards its in-register position. Likewise shunts 39 and 40 provide a means for indicating the in-register position of the printing cylinder and shunts 40 and 41 provide a means for indicating when said device is out of register in a forward or advanced direction and also indicates when the printing cylinder passes its index point or predetermined position both of which are indicated when the arm 37 is between the shunts 39 and 40.

In a similar manner the bias on the screen grid 30 of the tube 13 is controlled by the tubes 92 and 93. The tubes are connected in parallel across a direct current source of potential having its positive terminal at 94 and its negative terminal at 95. Load resistors 96 and 97 are provided for the same purpose as the corresponding load resistors 67 and 70. Control grid 98 is provided in tube 92 and control grid 99 is provided in tube 93. The two tubes 92 and 93 are arranged in identical manner as the tubes 63 and 64 such that when one of the tubes conduct a current it is impossible for the other to conduct any substantial amount of current. The screen grid 30 is connected to the point 100 in the anode circuit of the tube 92. When the magnet 35 is rotating from the shunt 39 toward the shunt 40, a positive potential is placed on the control grid 98 which means that the tube 92 is conducting a current and tube 93 is not conducting and the point 100 is driven in a negative direction due to the load resistor 96 and a negative potential is maintained on the screen grid 30 which prevents tube 13 from conducting a current. Under this condition the relay coil 101 is not energized and the relay switch 102 is not actuated and the device is in register. Thus when the device is in register, it is impossible for either of the tubes 12 or 13 to conduct current due to the maintenance of a negative potential on the screen grids 29 and 30. However immediately upon the arm 37 leaving the shunt 40, a negative potential is placed on the control grid 98 which renders the tube 92 substantially nonconducting and tube 93 conducts. When this occurs, point 100 is relatively positive and screen grid 30 is relatively positive. If at any time during the rotation of the arm 37 between the shunts 40 and 41 the mark 11 is "seen" by the phototube 10, a positive potential is placed on the control grid 19 of tube 13 simultaneously with the positive potential placed on the screen grid 30 and the tube 13 conducts a current which closes the relay 102 to operate the motor 92 of Figure 2 in a direction opposite to that caused by the closing of relay 83 thereby actuating the speed controller 90 and decreasing the speed of the printing roll 48. In other words when the mark 11 so to speak appears between the shunts 40 and 41, the device is out of register in the forward direction and the speed of the printing roll 48 must be reduced. Thereby the arrangement of the tubes 92 and 93 provides a means for maintaining a negative potential on the control grid 98 for the period during which the arm 37 is rotating between the shunts 40 and 41 or the printing cylinder 48 is rotating past its predetermined or registration position between the shunts 39 and 40. During this time a positive potential is maintained on the control grid 99 which maintains the tube 92 in non-conducting condition and thereby maintains a positive bias on the screen grid 30 so that, if an index mark 11 appears at this time, the tube 13 will conduct due to the fact that a positive potential has been placed simultaneously on the screen grid 30 and the control grid 19. As the magnet 35 leaves the shunt 41 it places a negative potential on the control grid 62 of tube 16 and if either of the tubes 12 or 13 have been ionized during the cycle just described, it will be deionized and the cycle is ready to begin again.

Referring again to Figure 2, the sheet 28 is passed by feeding means (not shown) to the cylinders 84 and 48 in the direction indicated by the arrow 103. Suitable feeding rolls and tension rolls are of course required for feeding the web during the printing operation but this forms no part of my invention.

The above description is merely illustrative of my invention and it is understood that other modifications may be made within the scope of my invention.

Figure 5:
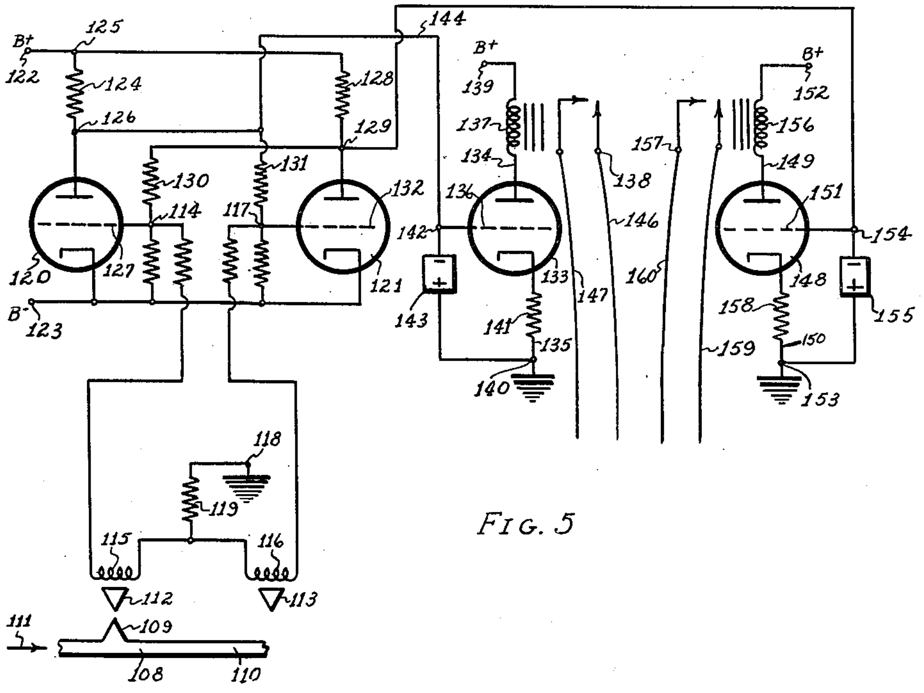
Figure 5 illustrates my magnetic switch and circuit for use in connection with automatic power tool machinery such as a lathe.

Figure 5 illustrates the use of my magnetic switch together with my electronic circuit, in connection with automatic power tool machinery such as a lathe. In the particular application of my invention as illustrated in Figure 5, a lathe has a cutting tool in which a predetermined length of cut must be taken in each longitudinal movement of the cutting tool along the piece being cut. For this purpose a movable magnet 108 is provided in which the point 109 is the south pole and the bar 110 is the north pole. The magnet 108 moves in the direction of the arrow 111 and is synchronized with the movement of the cutting tool on the lathe. A first shunt 112 is provided as well as a second shunt 113. When the pole 109 is directly opposite the shunt 112 as shown in Figure 5, the point 114 is driven in a negative potential (as illustrated in Figure 4) from point B to point C due to the induced current in the induction coil 115. Likewise the induction coil 116 causes a negative potential to be placed at point 117 when the magnet 108 reaches a position directly opposite the shunt 113. The magnet 108 in being synchronized with the cutting tool of the lathe together with the rest of the apparatus, provides a means for causing the lathe cutting tool to begin cutting when the pole 109 is directly opposite the shunt 112 and to cause the cutting operation to cease when the pole 109 is directly opposite the shunt 113. The induction coils 115 and 116 are connected to the ground 118 through the resistor 119.

A pair of electronic amplifying tubes 120 and 121 are provided and function in the same manner as the tubes 92 and 93 of Figure 1. The tubes 120 and 121 are connected in parallel across a direct current source of potential having its positive terminal at 122 and its negative terminal at 123. Tube 120 has a load resistor 124 connected in its anode circuit between points 125 and 126. The tube 120 is provided with the control grid 127.

The tube 121 has a load resistor 128 connected in its anode circuit between the point 125 and the point 129. The anode circuit of the tube 121 is connected from the point 129 through the resistor 130 to the control grid 127 of the tube 120 at the point 114. The anode circuit of the tube 120 is connected through the resistor 131 to the control grid 132 of the tube 121 at the point 117. Thus the two tubes 120 and 121 are connected 180° out of phase such that only one tube at a time can conduct current or in other words, such that when the control grid 127 is driven negative by the current induced in the coil 115, the control grid 132 is driven positive and when the control grid 132 is driven negative by the current induced in coil 116 the control grid 127 is driven positive.

Another amplifying tube 133 is provided having an anode circuit 134, a cathode circuit 135 and a control grid 136. In the anode circuit 134 is provided a relay coil 137 which controls the actuation of the relay switch 138. The tube 133 is connected across a source of potential having its positive terminal at 139 and grounded at 140. A suitable biasing resistor 141 is provided in the cathode circuit. The control grid 136 of the tube 133 is connected from the point 142 through the bias rectifier 143 to the ground 140. Thus the control grid 136 except as affected by the circuit involving tubes 120 and 121 as will be hereinafter described, is maintained at a negative potential, whereby the tube 133 does not conduct any substantial amount of current and the relay switch 138 is not actuated. However the control grid 136 is also connected by means of the line 144 to the point 126 in the loaded anode circuit of the tube 120. When the pole 109 is directly opposite the shunt 112 as shown in Figure 5, a negative potential is placed on the control grid 127 and the tube 120 substantially ceases to conduct and the point 126 is then substantially of the same potential as the positive terminal 122 and therefore a relatively high positive potential is placed on the control grid 136 of the tube 133 which causes the tube 133 to conduct thereby energizing the relay coil 137 and actuating the relay switch 138. The relay switch 138 is connected through lead lines 146 and 147 to the lathe control. When the relay switch 138 is actuated the cutting tool of the lathe is forced into initial position for cutting on the article desired to be cut. Such a lathe control forms no part of this invention and such controls are well known in this art. My invention resides in the particular device for controlling the lathe control and does not reside in the particular mechanical apparatus for the lathe control. For this reason the actual lathe control device is not shown and it is not deemed necessary to show it.

Another amplifying tube 148 is provided having an anode circuit 149, a cathode circuit 150 and a control grid 151. The tube 148 is connected across a source of potential having its positive terminal at 152 and its ground at 153. The control grid 151 is biased similar to the control grid 136 by having the point 154 connected through a bias rectifier 155 to the ground 153 such that a negative bias is normally maintained on the control grid 151. A biasing resistor 158 is employed in the cathode circuit 150. The anode circuit 149 of the tube 148 is provided with a relay coil 156 which controls the actuation of the relay switch 157. The control grid 151 of the tube 148 is connected to the point 154 which in turn is connected to the point 129 in the anode circuit of the tube 121. When the pole 109 is directly opposite the shunt 112 as shown in Figure 5, a negative bias is maintained on the control grid 127 which maintains a positive bias on the control grid 132 of the tube 121 and the point 129 is maintained negative which maintains a negative bias on the control grid 151 of the tube 148 and the tube 148 conducts little or no current. However when the magnet 108 moves in synchrony with the cutting tool until it reaches the point directly opposite the shunt 113, a current is induced in the coil 116 which places a negative bias on the control grid 132 and as herebefore explained, a positive bias is placed on the control grid 127 and the point 126 is driven negatively which maintains a negative bias on the control grid 132 and prevents tube 121 from conducting a current. When this occurs, the point 129 is substantially at the same potential as the positive terminal 122 and a positive potential is placed on the control grid 151 which causes the tube 148 to conduct a current. When the tube 148 conducts a current, the relay coil 156 is energized and the relay switch 157 is closed. The relay switch 157 is connected through lead lines 158 and 159 to the lathe control. When the switch 157 closes, the magnet 108 is reciprocated back to its original starting position since it is in synchrony with the cutting tool which is controlled in that manner, and the cycle begins again.

I have therefore provided a means for controlling the cutting tool on a lathe. When the pole 109 is directly opposite the shunt 112, the cutting tool begins to cut and when the pole 109 reaches the point opposite shunt 113, the cutting tool ceases to cut and is reciprocated back to its starting position. It is obvious that the embodiment of my invention as illustrated in Figure 5 has many applications. Instead of controlling the cutting tool it could equally well control a surface grinder in which the shunt 112 would correspond to the point grinding should begin and the shunt 113 would correspond with the point where grinding should stop. My invention does not reside in its many applications, but resides in the circuit and the magnetic switch as illustrated in Figures 1 and 5.

Figure 6:
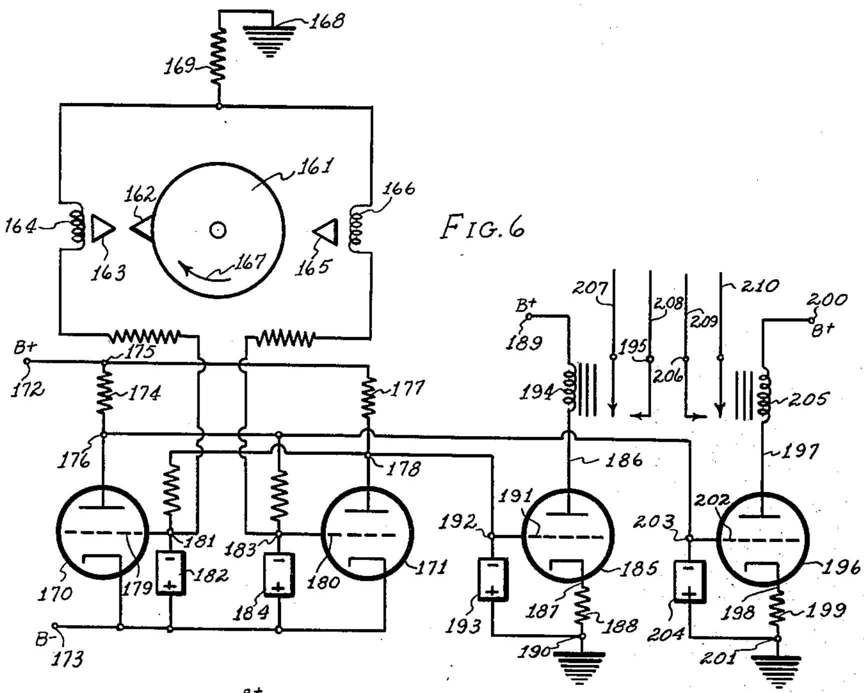
Figure 6 illustrates my magnetic timer and circuit for use in control of a multi-color electric sign.
Figure 9:
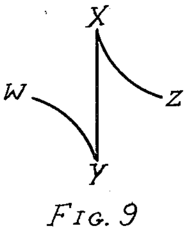

Figure 6 illustrates my magnetic timer and circuit for use in the control of a multi-color electric sign. Many electric sign displays are arranged such that, for example, a figure or name in blue appears for a short while and then the blue figure goes out and a red figure or name appears. Referring to Figure 6, a suitable timing clock 161 is provided having a magnet in which the point 162 is the north pole of the magnet. A shunt 163 is provided and an induction coil 164 is associated with the shunt 163. A second shunt 165 is provided together with induction coil 166 which is associated with it. By having the point of the magnet 162 being the north pole rather than having the point being the south pole which is the case in Figures 1 and 5, a positive current is generated in the induction coils 164 and 166 when the pole 162 comes opposite the respective shunts 163 and 165. As the point 162 approaches the shunt 163 in rotating in the direction of the arrow 167, a negative pulse is generated which increases from W to Y of Figure 9 and as soon as the point 162 comes opposite the shunt 163, the negative potential rises from point Y to a positive potential at point X of Figure 9, which latter point represents the magnitude of the potential of the current generated in the induction coil 164. Similarly when the point 162 comes directly opposite the shunt 165, a positive potential is generated in the induction coil 166. The induction coils 164 and 166 are connected to the ground 168 through the resistor 169.

A pair of amplifying tubes 170 and 171 are provided and serve the same function as the amplifying tubes 120 and 121 of Figure 5. The tubes 170 and 171 are connected 180° out of phase and in parallel across a direct current source of potential having its positive terminal at 172 and its negative terminal at 173. The anode circuit of tube 170 has a load resistor 174 connected between points 175 and 176. The tube 171 has an anode circuit in which is connected the load resistor 177 between the points 175 and 178. A control grid 179 is provided in tube 170 and a control grid 180 is provided in the tube 171. The control grid 179 is connected at point 181 to the negative side of the bias rectifier 182 and the control grid 180 is connected at the point 183 to the negative side of the bias rectifier 184.

The control grid 179 is connected from the point 181 to the point 178 and the control grid 180 is connected from the point 183 to the point 176. Thus the two tubes 170 and 171 are connected 180° out of phase with each other, i. e., when the control grid 179 is negative, the control grid 180 is positive and vice versa. When the point 162 of the magnet comes directly opposite the shunt 163 as shown in Figure 6, a positive potential is created in the induction coil 164 which places a positive potential on the control grid 179 causing the tube 170 to conduct. When tube 170 conducts, the point 176 is driven in a negative direction of potential which places a negative potential on the control grid 180 of tube 171 causing tube 171 to substantially cease conducting a current and the point 178 becomes substantially the same potential as the positive terminal 172 which places a positive potential on the control grid 179 of tube 179 thereby maintaining the tube 170 conducting. When the point 172 reaches the point directly opposite the shunt 165, a positive potential is created in the induction coil 166 which places a positive potential on the control grid 180 thereby causing a relative negative potential to be placed on the point 178 and the control grid 179 which causes the tube 170 to cease to conduct resulting in a positive potential being placed at the point 176 and on the control grid 180.

Another amplifying tube 185 is provided having an anode circuit 186 and a cathode circuit 187. A suitable biasing resistor 188 is provided in the cathode circuit 187. The tube 185 is connected to a source of potential having its positive terminal at 189 and grounded at 190. The tube 185 is provided with a control grid 191. The control grid 191 is connected to point 192 of the negative side of the bias rectifier 193. The anode circuit 186 is provided with a relay coil 194 which controls the relay switch 195.

An amplifying tube 196 is provided arranged similar to the tube 185. The tube 196 has an anode circuit 197 and a cathode circuit 198. A suitable biasing resistor 199 is provided in the cathode circuit 198. The tube 196 is connected to a source of potential having its positive terminal at 200 and grounded at 201. The tube 196 is provided with a control grid 202 which is connected at the point 203 to the negative side of the biasing rectifier 204. The anode circuit 197 is provided with a relay coil 205 which controls the relay switch 206. The relay switch 195 is connected through lead lines 207 and 208 to the control mechanism for the electric sign. Likewise the relay switch 206 is connected through the leads 209 and 210 to the sign control. The particular mechanism for controlling the different colors on the sign for definite time intervals is well known in this art and it is therefore not illustrated since it forms no part of my invention. My invention resides in the magnetic timer including the clock 161 and the pole 162 together with the related electronic circuit.

The device of Figure 6 works as follows: When the pole 162 of the clock 161 comes opposite the shunt 163, the relay switch 195 is closed and the relay switch 206 is maintained open. The closing of the relay switch 195 for example turns on the blue light of the sign and the red light remains dark due to the fact that the relay switch switch 206 remains open. This condition remains fixed until the pole 162 comes opposite shunt 165 at which time the relay switch 195 opens and the relay switch 206 closes, the blue light thereby being extinguished and the red light being lit. This condition exists until the pole 162 again comes opposite shunt 163 and the cycle is then repeated. It is of course possible therefore that any number of lights can be lit and extinguished at predetermined intervals depending upon the number of shunts 163 and 165 that are arranged around the circumference of the pole 162. Of course for an increase in the number of shunts to control various colors of lights, a corresponding number of induction coils and amplifying tubes would have to be provided.

Figures 7, 8:
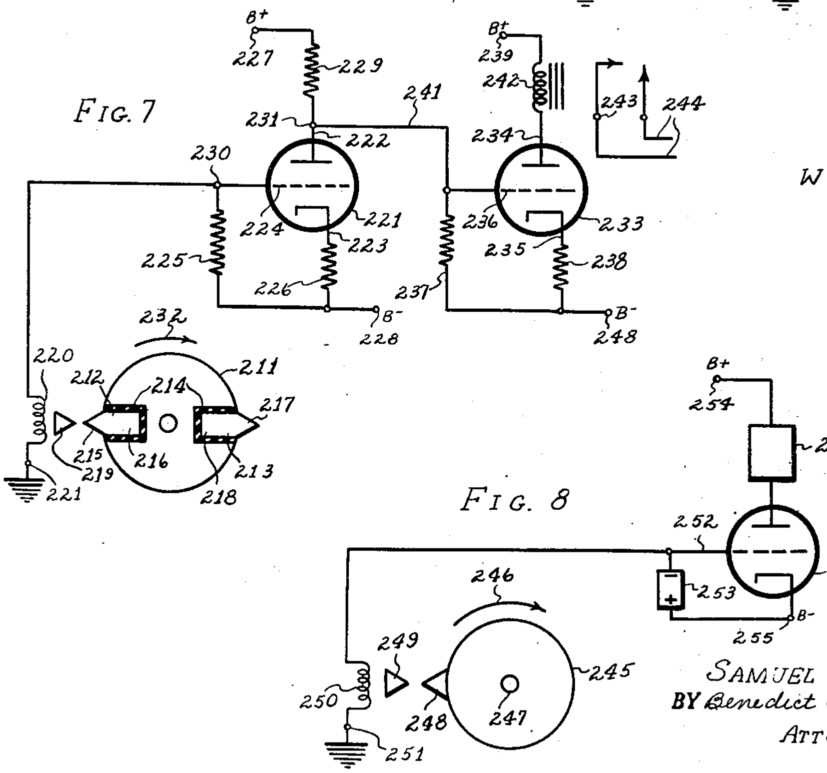
Figure 7 illustrates a more simplified circuit and switch for alternately controlling the bias on a control grid from negative to positive and then repeating the cycle.
Figure 8 is a still more simplified design for alternating the bias on a control grid of an amplifying tube.

Figure 7 illustrates a more simplified mechanism for alternately controlling the bias on a control grid such that the bias is changed from negative to positive and then from positive to negative and the cycle repeated. Here again the particular thing the device of my invention is controlling is unimportant since it is obvious that it has many uses. In Figure 7 a rotating disk 211 is provided with a pair of magnets 212 and 213 on opposite sides of the disk 211. The magnets 212 and 213 are insulated from each other by the insulating material 214 which may be rubber, or any suitable non-conductor of electricity. The magnet 212 is such that the point 215 constitutes the north pole and the base 216 constitutes the south pole. The magnet 213 is arranged oppositely so that the point 217 constitutes the south pole and the point 218 constitutes the north pole.

A shunt 219 is provided together with an induction coil 220 associated with the shunt 219. The induction coil 220 is grounded at point 221. When the magnet 212 comes directly opposite the shunt 219 as shown in Figure 7, the current induced in the coil 220 is of a positive potential. When the magnet 213 comes directly opposite the shunt 219, the potential generated in the induction coil 220 is reversed and a negative potential is induced. An amplifying tube 221 is provided having an anode circuit 222, a cathode circuit 223 and a control grid 224. Suitable biasing resistors 225 and 226 are provided so that the tube 221 operates at about the mid-point of its conductance. That is, the tube is conducting a current about half way between zero current and the maximum current the tube can conduct. The tube 221 is connected across a direct current source of potential having its positive terminal at 227 and its negative terminal at 228. A load resistor 229 is connected between points 227 and 222. The control grid 224 is connected at point 230 to the induction coil 220. When the magnet 213 comes directly opposite the shunt 219 as shown in Figure 7, a positive potential is created in the induction coil 220 which places a positive potential on the control grid 224 of tube 221 which results in an increase in the flow of current through tube 221 and the point 231 is driven in a relative negative direction due to the presence of the load resistor 229 in the anode circuit 222. This condition exists during the rotation of the element 211 in the direction of the arrow 232 until the magnet 213 comes directly opposite the shunt 219 at which time a negative potential is created in the induction coil 220 which places a negative potential on the control grid 224 of the tube 221 resulting in a decrease in the flow of current flowing through the tube 221 and the point 231 is increased in the positive direction. Thus in Figure 7 the element 211, by being provided with magnets having points 215 and 217 opposite in polarity, causes the tube 221 first to conduct an increased amount of current over the mid-point of conductance and then the current is decreased below its mid-point in conductance. The tube 221 is provided primarily to provide amplification of the positive or negative pulse biased in the induction coil 220.

Another tube 233 is provided having an anode circuit 234, a cathode circuit 235 and a control grid 236. Suitable biasing resistors 237 and 238 are provided. The tube 233 is connected across a direct current source of potential having its positive terminal at 239 and its negative terminal at 248. The control grid 236 is connected through the line 241 to the point 231 in the loaded anode circuit of the tube 221. Thus the tubes 221 and 233 are 180° out of phase. The tube 233 has a relay coil 242 in the anode circuit 234 which controls the relay switch 243. The relay switch 143 is connected by means of the connecting lines 244 to a suitable control apparatus depending upon the device controlled by the circuit shown in Figure 7. The operation of Figure 7 may be summarized as follows: When the magnet 212 comes opposite the shunt 219, a positive potential is placed in the control grid 236 of the tube 233 which energizes the relay coil 242 and closes the relay switch 243. This condition exists until the magnet 213 comes opposite the shunt 219 at which time the relay coil 242 is de-energized and the relay switch 243 is opened. This condition exists until the magnet 213 again comes opposite the shunt 219 and then the cycle is repeated. Thus I have provided a means for opening and closing the relay switch 243 as well as first energizing and then de-energizing the energy translation means such as a relay coil 242. The element 211 can be synchronized with a mechanical movement which is controlled by the opening and closing of the relay switch 243.

Figure 8 shows the most simplified form of my invention. In Figure 8 a rotating element 245 is provided which rotates in the direction of the arrow 246. The element 245 is a permanent magnet in which the axis of rotation 247 is the south pole and the point 248 is the north pole. A shunt 249 is provided and an induction coil 250 grounded at the point 251 is associated with the shunt 249. By having the point 248 the north pole of the magnet, a negative potential is created in induction coil 250 when the point 248 is directly opposite the shunt 249 as shown in Figure 8. An amplifying tube 251 is provided having a control grid 252. The control grid 252 is connected to the negative side of the biasing rectifier 253 so that the bias on the control grid 252 is normally such that the tube 251 is conducting a current. However each time the point 248 comes opposite the shunt 249, a positive bias is placed on the control grid 252 which substantially increases the flow of current through the tube 251. The tube 251 is connected across a direct current source of potential having its positive terminal at 254 and its negative terminal at 255. A suitable energy translation means 256 is provided in the anode circuit of the tube 251. The energy translation means 256 may be a relay coil such as the relay coil 242 of Figure 7, a bell, a meter, a light or any means for indicating when the point 248 is opposite the shunt 249.

I claim as my invention:

1. A device responsive to the position of a moving mechanical element at the occurrence of an electrical signal, and discriminating the occurrence of said signal in at least one period of said movement from its occurrence in other periods of said movement comprising a main amplifier and an auxiliary amplifier with two stable modes of operation, a magnetized arm connected to said mechanical element, two magnetic shunts spaced from but along the path of movement of said arm, at least one coil magnetically interlinked with each of said shunts, said coils being connected to said auxiliary amplifier so that an impulse in one of them changes said auxiliary amplifier into one mode of operation and an impulse in one of the others changes said auxiliary amplifier into the other mode of operation, said electrical signal being fed to said main amplifier through one channel and said auxiliary amplifier being connected to said main amplifier through another channel.

2. A device responsive to the position of a moving mechanical element at the occurrence of an electrical signal comprising a magnetized arm connected to said mechanical element, at least one magnetic shunt spaced from but along the path of movement of said arm, at least one coil electromagnetically interlinked with said shunt so that passage of said arm in front of said shunt causes an electromotive force in said coil, and an electronic amplifier sensitive to both said electrical signal and said electromotive force, the ends of both said arm and said shunt adjacent to each other being wedge shaped and having edges parallel to and at a small distance from each other at the passage of said arm in front of said shunt, providing thereby a voltage impulse in said coil having both a negative and a positive portion with an abrupt transition between these two portions.

SAMUEL C. HURLEY, Jr.

REFERENCES CITED

The following references are of record in the file of this patent:

UNITED STATES PATENTS

| Number | Name | Date |
|---|---|---|
| 531,075 | Waldron | Dec. 18, 1894 |
| 1,844,950 | Finch | Feb. 16, 1932 |
| 2,052,263 | Whiteley | Aug. 25, 1936 |
| 2,105,185 | Degnan | Jan. 11, 1938 |
| 2,151,570 | Shoults et al. | Mar. 21, 1939 |
| 2,230,715 | Cockrell | Feb. 4, 1941 |
| 2,306,361 | Stuart | Dec. 22, 1942 |
| 2,348,862 | Sorkin | May 16, 1944 |
| 2,396,706 | Kott | Mar. 19, 1946 |
| 2,429,500 | Wolfner, 2d | Oct. 21, 1947 |

FOREIGN PATENTS

| Number | Country | Date |
|---|---|---|
| 544,601 | Great Britain | Apr. 20, 1942 |